US012812298B2

(12) United States Patent
Yao et al.

(10) Patent No.: US 12,812,298 B2
(45) Date of Patent: Nov. 24, 2026

(54) SYSTEMS AND METHODS FOR MICROPHONE SIGNAL SELECTION IN MULTIPLE MICROPHONE SUPPORTED DEVICES FOR IMPROVED AUDIO PROCESSING

(71) Applicant: Agora Lab, Inc., Santa Clara, CA (US)

(72) Inventors: Siqiang Yao, Shanghai (CN); Sen Li, Shanghai (CN); Guangjian Xu, Shanghai (CN); Ruofei Chen, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 188 days.

(21) Appl. No.: 19/002,204

(22) Filed: Dec. 26, 2024

(65) Prior Publication Data

US 2026/0189850 A1 Jul. 2, 2026

(51) Int. Cl.

| | |
|---|---|
| ***H04R 3/02*** | (2006.01) |
| ***H04R 1/40*** | (2006.01) |
| ***H04R 3/00*** | (2006.01) |
| ***H04R 29/00*** | (2006.01) |

(52) U.S. Cl.

CPC ............... *H04R 3/02* (2013.01); *H04R 1/406* (2013.01); *H04R 3/005* (2013.01); *H04R 29/005* (2013.01); *H04R 2410/01* (2013.01)

(58) Field of Classification Search

CPC .......... H04R 3/02; H04R 3/005; H04R 1/406; H04R 29/005; H04R 2410/01

See application file for complete search history.

(56) References Cited

U.S. PATENT DOCUMENTS

| | | | | |
|---|---|---|---|---|
| 5,625,697 | A * | 4/1997 | Bowen | H04M 9/08 379/202.01 |
| 9,742,573 | B2 * | 8/2017 | Chen | H04L 12/1813 |
| 2010/0081487 | A1 * | 4/2010 | Chen | H04M 1/605 455/575.1 |
| 2024/0195918 | A1 * | 6/2024 | Piket | G10L 21/0216 |

* cited by examiner

*Primary Examiner* — Jason R Kurr
(74) *Attorney, Agent, or Firm* — IP Strategy Consulting

(57) ABSTRACT

Systems and methods for adaptive selection of microphones in a multi-microphone device includes identifying if an echo is present in a first and a second microphone input. When no echo is present then the system may simply select a default microphone. However, when the echo is present then the system may calculate a signal strength measure for the first and the second microphone inputs. When the signal strength measure for the first and the second microphone inputs are both below a threshold then the system may select the default microphone. However, if the signal strength measure for either the first and the second microphone inputs are at or above the threshold then the system may perform a series of calculations in order to select from between the two microphones.

20 Claims, 6 Drawing Sheets

SYSTEMS AND METHODS FOR MICROPHONE SIGNAL SELECTION IN MULTIPLE MICROPHONE SUPPORTED DEVICES FOR IMPROVED AUDIO PROCESSING

BACKGROUND

The present invention relates in general to the field of audio processing, and more specifically to methods, computer programs and systems for microphone selection in a device that supports multiple microphones. More frequently, audio processing devices, such as cellular phones, laptops, and other audio enabled devices, have multiple microphones. These microphones enable more consistent and accurate capture of audio signals. Historically, the microphone selected for a given recording of sounds has been deterministically chosen based upon the device configuration and use case.

The various microphones on a device may experience dramatically different inputs based upon their location and proximity to other device elements, such as speakers. For example, on a typical smart cell phone, the proximity of the bottom microphone to the speaker may result in a ten-decibel difference in echo feedback as compared against the top microphone. The device speaker is located closer to the bottom microphone. The default in most android devices is to have the bottom microphone the active microphone. While the device includes acoustic echo cancellation to reduce these echo artifacts, selecting an input signal where the feedback is significantly lower allows for better audio quality.

Given that there is great value in improving audio quality, an adaptive method and system for selection of which microphone to utilize for devices with multiple microphones is provided.

SUMMARY

The present systems and methods relate to audio processing, and particularly to adaptive microphone signal selection in devices which support multiple microphones. Such systems and methods enable improved audio processing by reducing the echo and other artifact signals from being included in the recorded audio signal.

In some embodiments, the methods and systems for adaptive selection of microphones in a multi-microphone device includes, identifying if an echo is present in a first and a second microphone input. When no echo is present then the system may simply select a default microphone. However, when the echo is present then the system may calculate the maximum absolute energy for the first and the second microphone inputs. Alternatively, other quantities that indicate signal strength may be employed in addition to, or in lieu of, the maximum absolute energy.

When the maximum absolute energy, or other signal strength indicator, for the first and the second microphone inputs are both below a maximum absolute energy threshold then the system may select the default microphone. However, if the maximum absolute energy for either the first and the second microphone inputs are at or above the maximum absolute energy threshold then the system may perform a series of calculations. In some embodiments, the maximum absolute energy threshold is approximately 0.05 when the maximum given input signal is normalized between [−1,1]. In most RTC audio applications, time-domain sample of the input audio signal is represented using signed int16, with the value of each sample occurring in the range of [−32768, 32767]. The threshold of 0.05 is calculated assuming the sample value falls into the range of [−1,1]. For example, 0.05=1,638/32,768. The range of the possible audio sample values are normalized to [−1,1]. The input audio signal value for each frame need not be normalized.

The calculations may include calculating if the maximum absolute energy of the first microphone input multiplied by a first multiplier is less than the maximum absolute energy of the second microphone input, and calculating if the maximum absolute energy of the second microphone input multiplied by a second multiplier is less than the maximum absolute energy of the first microphone input. In some embodiments the first and second multipliers are equal, and specifically approximately 1.2.

When the maximum absolute energy of the first microphone input multiplied by the first multiplier is less than the maximum absolute energy of the second microphone input the system may subtract from a counter. Conversely, when the maximum absolute energy of the second microphone input multiplied by the second multiplier is less than the maximum absolute energy of the first microphone input the system may add to the counter.

If the counter is below a negative threshold then the system may select the first microphone input. Likewise, if the counter is above a positive threshold the system may select the second microphone input. Lastly, the system may select the default microphone when the counter is at or between the negative and positive thresholds.

The system may also analyze each audio frame for an abnormal condition: either the first microphone input or the second microphone input being below a lower energy threshold, and a difference between the first microphone input and the second microphone input is above a difference threshold. In some cases the lower energy threshold is approximately 77 decibels, and the difference threshold is approximately 15 decibels. If the abnormal condition is detected for a set time interval, say approximately 500 ms, then the system will restore the adaptive microphone selection method to an initial state.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1A:
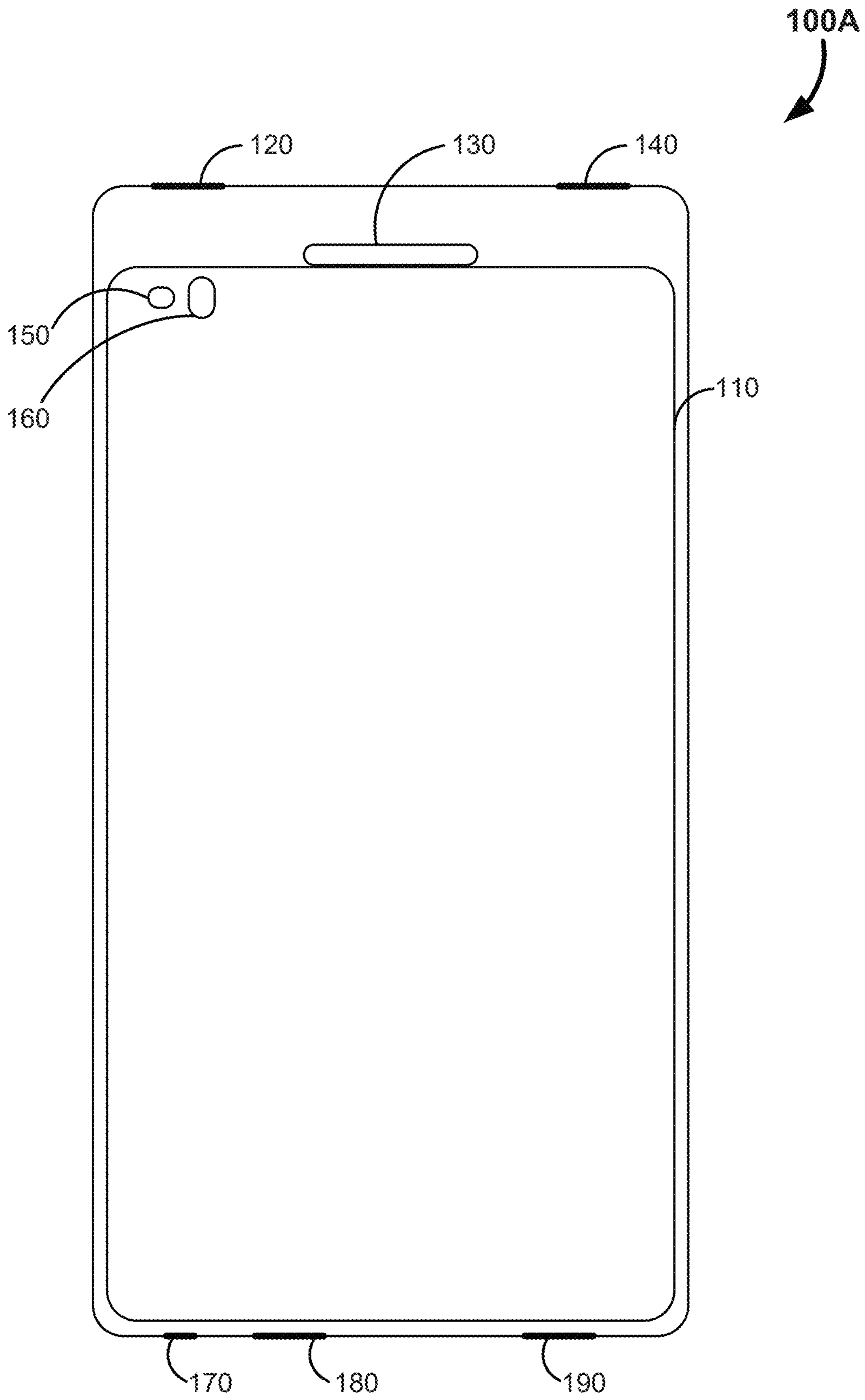
FIG. 1A is an example illustration of a multi-microphone enabled device, in accordance with some embodiment.

The present invention relates to systems and methods for adaptive selection of a microphone on a multi-microphone enabled device based upon the audio signal to improve audio processing. To facilitate discussions, FIG. 1A provides an example illustration of a device that typically includes multiple microphones: a smart phone. The example illustration shows an android device at 100A. This device includes a touchscreen 110, an input microphone on the top side of the device 120, a first speaker for the listener 130, and an infrared sensor 140. The top speaker is generally employed when the device is being used as a handset, with the speaker being placed adjacent to the user's ear.

The smart phone typically includes a front camera 150 and one or more rear cameras (not illustrated). An ambient light detector and proximity sensor 160 may be leveraged in determining when to activate the smart screen and to aid in photography.

The smart device may also include an audio jack 170 or other auxiliary connector. A main power and data transfer port, such as a USB-C port may also be located at the bottom of the device (not illustrated). These devices also typically also include a bottom microphone 180 and a bottom speaker 190. The bottom speaker is generally employed when the device is being used in speaker mode or if it is playing music, directions or other output.

By default, most android devices leverage the bottom microphone as the default input source. Due to the fact that the bottom speaker is proximal to the bottom microphone, there is significant feedback that may occur when recording audio signals. The device may employ acoustic echo cancellation techniques to minimize this echo, as well as other adaptive noise suppression techniques. That stated, being able to adaptively select which microphone signal to utilize may enhance audio signal quality.

It should be noted that this illustration and the subsequent discussion will center around devices with two microphones, and the selection between these two microphones. This is not intending to limit the scope of the disclosure, but rather is intended to clarify the invention and for the sake of brevity. Devices with many microphone inputs are likewise contemplated by this disclosure. In such devices, the input may be selected from among the multiple microphones, or in some cases, multiple microphone inputs may be aggregated into a single input signal. The weighting and selection of which microphones to utilize may be performed by the recording device, or a downlink device.

Figure 1B:
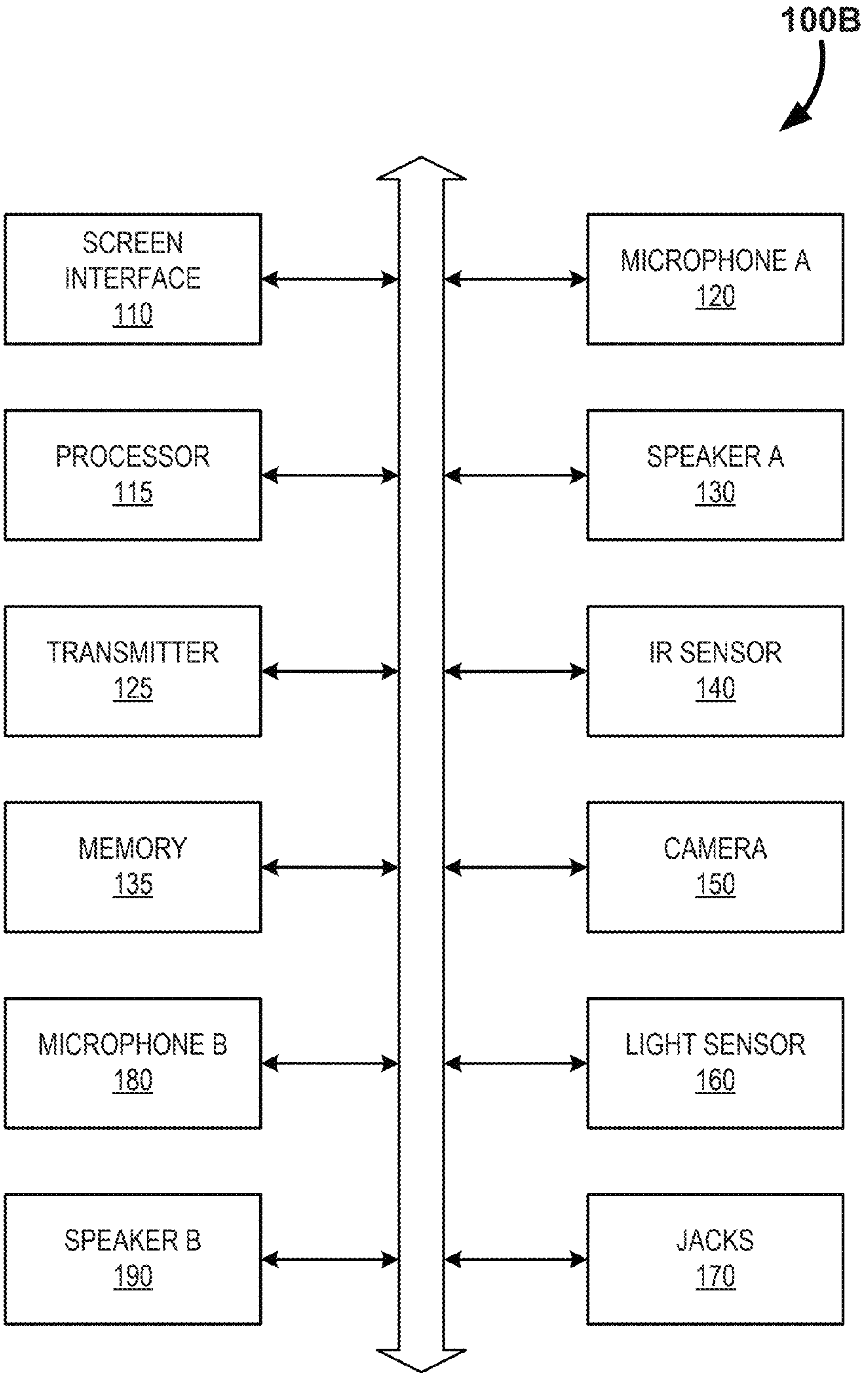
FIG. 1B is an example block diagram for the multi-microphone enabled device, in accordance with some embodiments.

FIG. 1B provides another diagram of the same recording device in a block diagram format, shown generally at 100B. Here the various subcomponents of the device are illustrated as being coupled to a central bus, and thus in communication with one another. The screen interface 110 is still a central part of the device as both a display, and as a input device through it's touch functionality. The first microphone 120 and first speaker 130 are present. The infrared sensor 140 may include many different sensor types, including a Bluetooth antenna, GPS antenna or any other suitable sensor or transmitter type. One or more cameras 150 and a light sensor 160 enable image and video capture by the device. In some embodiments, and auxiliary jack and/or main connector 170 enables the device to be connected to a peripheral device, to be charged and to enable data transfer. The device also includes a second microphone 180 and second speaker 190 locates at a different position from the first speaker and microphone. The device also includes a processor 115 capable of analyzing incoming signals and making selections of which microphone to utilize. A transmitter 125 enables the device to connect to various wireless networks, including for example the cellular network, wifi internet connection, or the like. Memory 135 enables short term caching and longer term storage of information.

Figure 2:
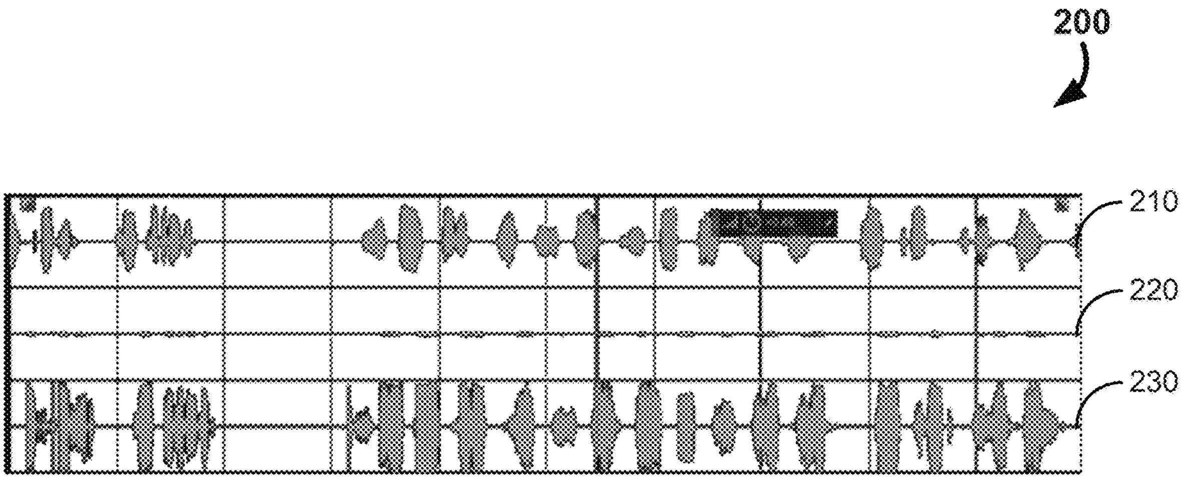
FIG. 2 is an example illustration of various sound waves, in accordance with some embodiments.

FIG. 2 provides an illustration of various soundwave signals, shown generally at 200, displaying motivation for the adaptive microphone selection process. In this example graph the signal at 210 represents the far-end signal before device playback. This is the signal played out the bottom speaker for the user to hear. The second signal 220 is the signal captured from the microphone on the top of the device. Conversely, the third signal shown at 230 is the signal captured from the microphone located on the bottom of the device (and closer to the output speaker). As can be seen in this example illustration, the signal captured from the top microphone 220 has a reduced input of over 10 decibels as compared to the signal captured from the bottom microphone 230. This significant reduction in echo pollution from the far-end signal, once combined with acoustic echo cancellation (AEC) techniques can largely remove any echoes and thus the signal quality can be greatly improved as compared to using the bottom microphone 230.

Figure 3:
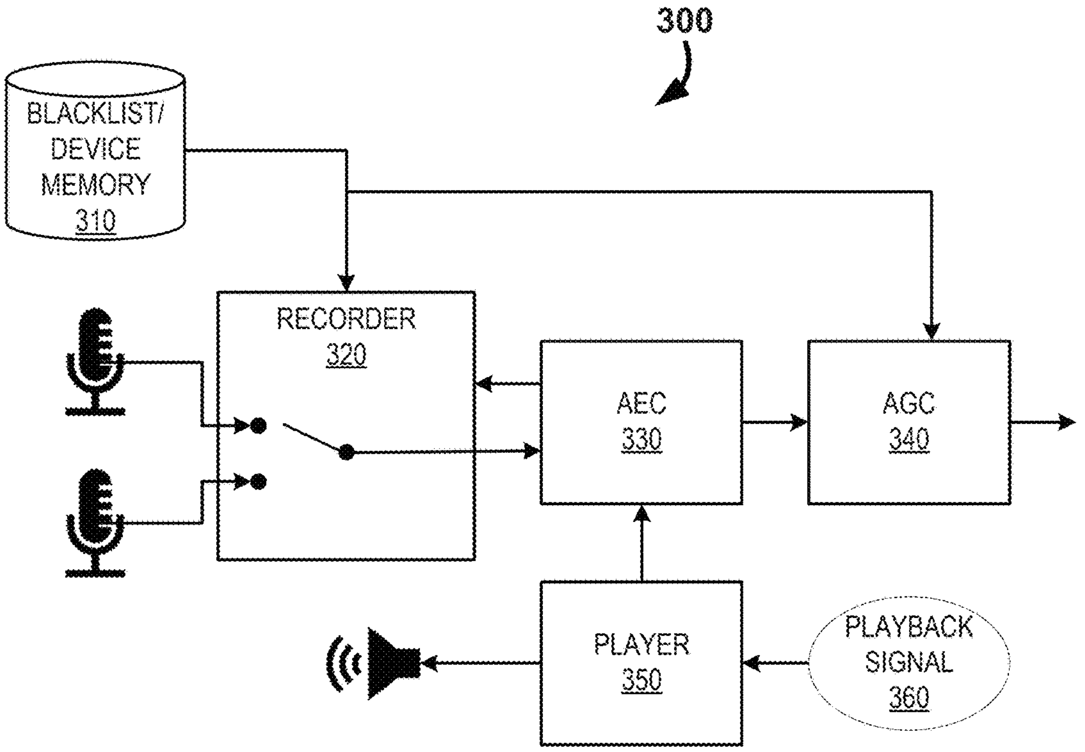
FIG. 3 is a block diagram for a system that adaptively selects which microphone to utilize, in accordance with some embodiments.

FIG. 3 provides a block diagram for the system where microphone selection is utilized, shown generally at 300. Here it can be seen that a recorded 320 receives the input from two different microphones and has the ability to select from between the two different inputs. The recorder 320 also checks for device blacklist information from the device memory 310. Device memory may include blacklists that supports a blacklisting mechanism to turn off the adaptive microphone selection under certain use cases to support robustness across devices. For example, certain devices may be added to the blacklist to disable adaptive microphone selection functionality. These blacklisted devices may be identified through lab verification, where devices that have defects in one of the two microphone recordings (e.g., one microphone consistently fails to provide stable recordings), or the blacklisting may be populated with devices reported by customers that have abnormal recording behaviors. The blacklist may include a pre-stored listing on the device memory or may be updated periodically as the device is connected to a backend server.

The recorded signal is provided, along with the far-end reference signal (not illustrated) to the acoustic echo cancellation (AEC) module 330. The AEC module 330 subtracts out the time delayed far end reference signal, received from the player 350, from the near end audio signal, from the microphones, to remove echo artifacts. The AEC module 330 may automatically determine if an echo exists in the recorded signals captured by each microphone. The recorder module 320 will analyze the signal characteristics, such as the maximum absolute energy of the signal or other indication of signal strength, to automatically and adaptively determine the suitable microphone to utilize. Not illustrated herein, a detection and recovery workflow may be leveraged to handle cases where the selected microphone malfunctions in the middle of the call. Such malfunctions may be caused, for example, by a device system bug or user mishandling of the device.

The adjusted signal is then provided to a module that analyzes the ambient noise. This adaptive noise suppression (ANS) module (not illustrated) adjusts the signal further to remove ambient noise from the signal. The further adjusted signal is provided to an automatic gain controller (AGC) 340 which is a circuit that is a closed-loop feedback regulating circuit that adjusts the relative amplification of the signal to ensure a consistent volume level. The system analyzes the level difference between the two recorded signals from the two different microphones. This information is provided to the AGC to prevent consistent low volume after uplink signal processing as well. This results in a clean, consistent audio signal that may be compressed and then transmitted via an antenna and transmission circuitry (not illustrated). A player 350 may play a playback signal 360.

The transmission may be via local Wi-Fi, cellular, via the internet, or by some combination of the above. This transmission via the cloud results in the signal being routed to a decoder located in an end/downlink device.

Figure 4:
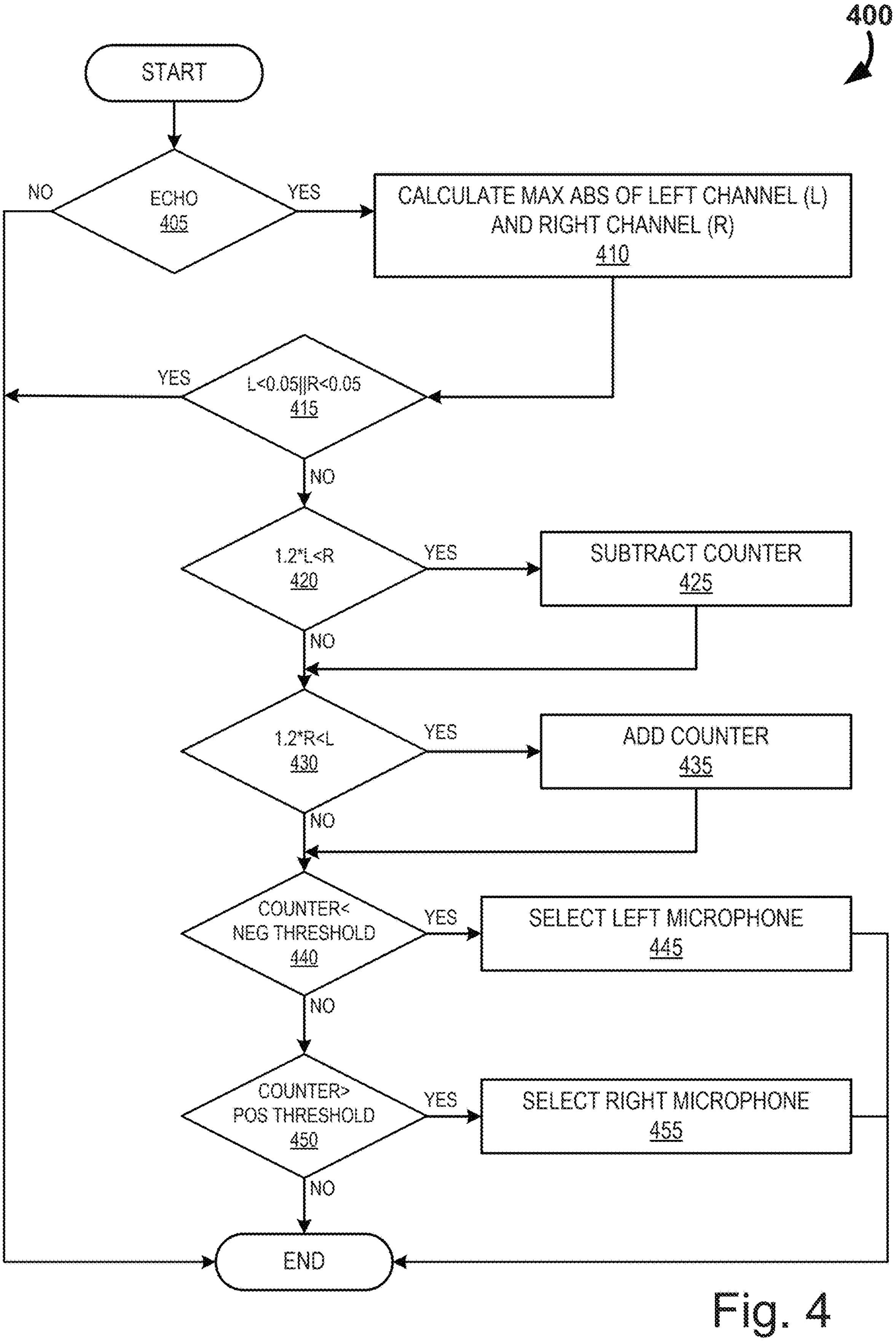
FIG. 4 is a flow diagram for an example process of adaptive microphone selection, in accordance with some embodiments.

FIG. 4 provides a block diagram of an example process for adaptive microphone selection in a dual microphone situation, shown generally at 400. The process starts with the recording of two signals, one from each microphone. A determination is made at the AEC module if there is an echo present in the microphones (at 405). If not, the default microphone can be leveraged and the process simply ends. However, if there is an echo present the recording module may calculate the maximum absolute value of the signal energy from the left channel and the right channel (at 410). In this example illustration, the top microphone and bottom microphone of the device may be coded as being a left channel and a right channel accordingly. This nomenclature is not intended to artificially limit the scope of the invention. Rather this naming convention is intended to differentiate the two incoming audio near-end signals.

If the maximum absolute energy of the signals is below a threshold for both the left and right channel (at 415) then the process may also end and merely leverage the default microphone. Note, much of the disclosure herein focuses on maximum absolute energy. This is one measure of signal strength. Alternative measures of signal strength may be leveraged in some alternate embodiments. Thus, it should be understood that anywhere herein where maximum absolute energy is discussed other measures of signal strength may be utilized. In some embodiments, this maximum absolute value threshold may be approximately 0.05. For the purposes of this disclosure, the terms 'about' and 'approximately' may indicate any value within plus of minus twenty percent of the stated value.

If the maximum absolute energy, or other measure of signal strength, of the left and/or right channel is above the threshold, however, a check may be made if the left channel maximum absolute energy times a first multiplier is less than the right channel maximum absolute energy level (at 420). In some particular embodiments, this multiplier is approximately 1.2, meaning that the check determines if 120% of the left channels maximum absolute energy is still less than the right channel maximum absolute energy. If so, a counter is subtracted (at 425).

Conversely, a similar check is made if the right channel maximum absolute energy, or other measure of signal strength, times a second multiplier is less than the left channel maximum absolute energy level (at 430). In some cases, the first and second multiplier are equal. In some particular embodiments, the multipliers are both set to approximately 1.2. If 120% of the right channels maximum absolute energy is still less than the left channel maximum absolute energy then the counter is added to (at 435). These checks of the maximum absolute energy levels between the left and right channels, as performed at steps 420 and 430 may be repeated for each audio frame. Generally an audio frame is 10 ms, 20 ms or some other predetermined length. These checks repeat until the channel selection is made, in the below selection steps. The system may also periodically monitor the energy levels of the two microphone recordings to flag potential abnormalities, as will be discussed in greater detail in relation to FIG. 5.

Subsequently, a check is made if the counter is below a negative threshold (at 440). If so, the left microphone is selected for use of recording (at 445). Conversely, if the counter is above a positive threshold (at 450) then the right microphone is selected for use of recording (at 455). If the counter is somewhere between the positive and negative threshold then the default microphone may be utilized. In some embodiments, the threshold is a predetermined absolute number. In other embodiments, the system may perform the above checks for a predetermined number of audio frames (e.g., a set time period). For example, the system may check each audio frame for echoes as outlined above in relations to steps 420 and 430, for 500 ms of time, and after the time period the channel is selected based upon if the counter is positive or negative. Basically, the system checks for the time period which microphone experiences more echo, and selects to employ the microphone with a smaller echo over the time period.

Once the microphone has been adaptively selected in this manner, the system may switch to an abnormal state detection and recovery mode of operation. As noted before, device bugs and/or user mishandling of the device may result in an abnormal operational state. The example process

Figure 5:
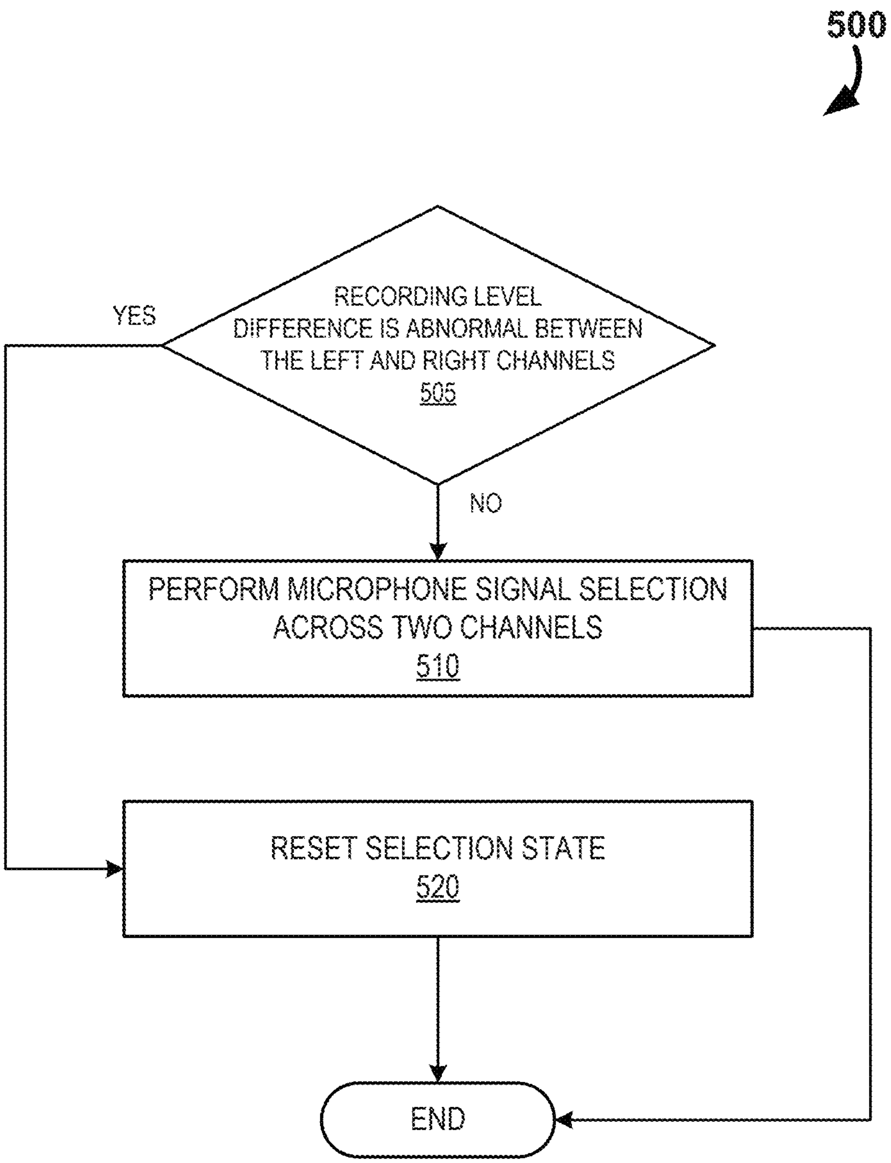
FIG. 5 is a flow diagram for an example process of abnormal state detection and recovery, in accordance with some embodiments.

500 illustrated in FIG. 5 monitors the device operations and determines if there is an abnormal level of recording between the left and right channels (at 505). If such an abnormality is detected, the selection state is reset (at 520). If the operation is normal, the microphone signal selection can be performed as normal between the two channels (at 510). Abnormal, as used herein, indicates if the following two conditions are met: any one of the microphone signal power is below a threshold decibel level, and the level difference between the two channels is larger than a second threshold. In some particular embodiments, the power level threshold is approximately 77 decibels, and the second power difference threshold is set to approximately 15 decibels. This check may be made for each audio frame. If the abnormal state is sustained for a fixed time interval, then the whole microphone selection process is restored to its initial state. In some particular embodiments, the fixed time interval is approximately 500 ms in length.

Figure 6A:
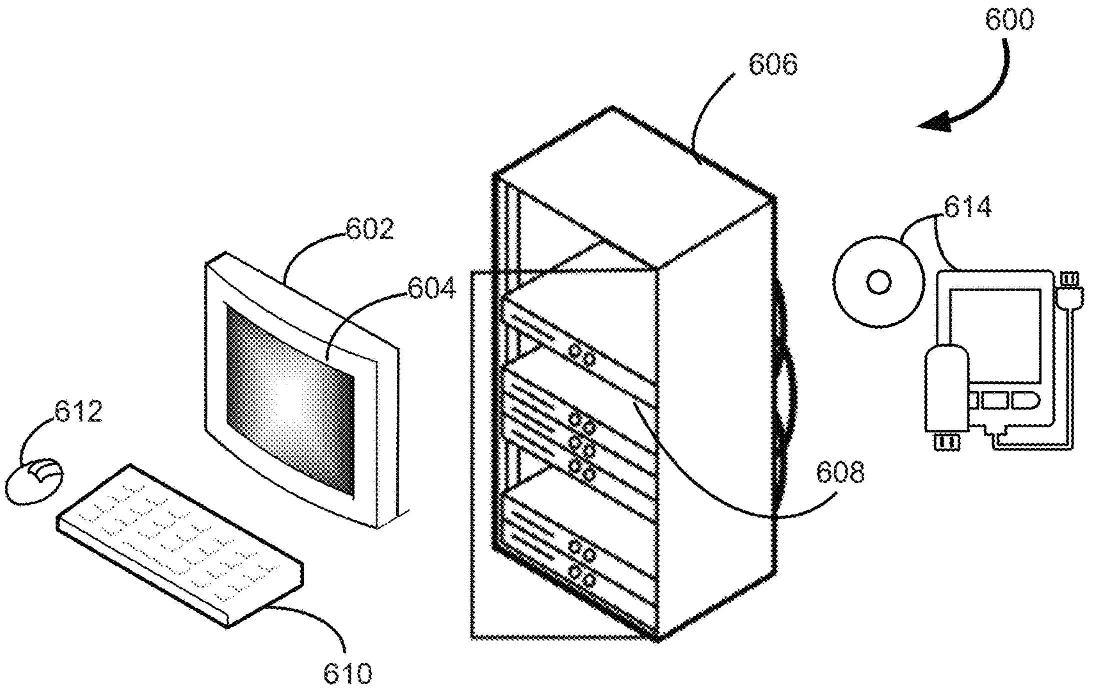
FIGS. 6A and 6B are illustrations of computer systems capable of implementing the adaptive microphone selection, in accordance with some embodiments.
Figure 6B:
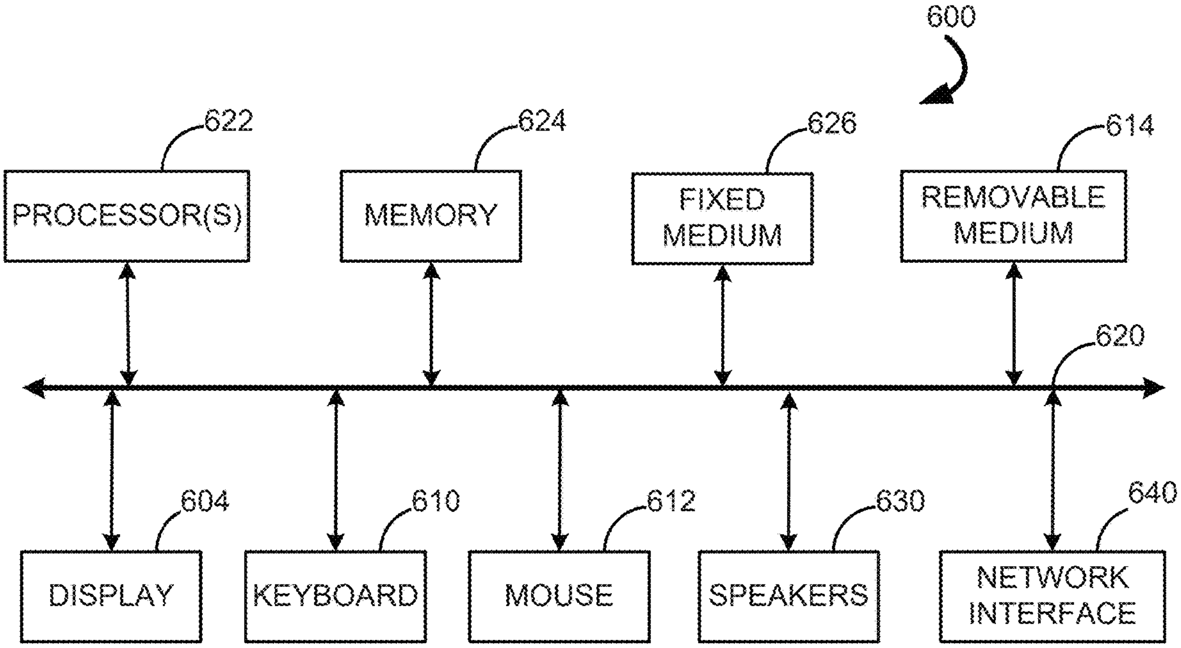

Now that the systems and methods for adaptive microphone selection have been provided, attention shall now be focused upon apparatuses capable of executing the above functions in real-time. To facilitate this discussion, FIGS. 6A and 6B illustrate a Computer System 600, which is suitable for implementing embodiments of the present invention. FIG. 6A shows one possible physical form of the Computer System 600. Of course, the Computer System 600 may have many physical forms ranging from a printed circuit board, an integrated circuit, and a small handheld device up to a huge supercomputer. Computer system 600 may include a Monitor 602, a Display 604, a Housing 606, server blades including one or more storage Drives 608, a Keyboard 610, and a Mouse 612. Medium 614 is a computer-readable medium used to transfer data to and from Computer System 600. FIG. 6B is an example of a block diagram for Computer System 600. Attached to System Bus 620 are a wide variety of subsystems. Processor(s) 622 (also referred to as central processing units, or CPUs) are coupled to storage devices, including Memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 626 may also be coupled bi-directionally to the Processor 622; it provides additional data storage capacity and may also include any of the computer-readable media described below. Fixed Medium 626 may be used to store programs, data, and the like and is typically a secondary storage medium (such as a hard disk) that is slower than primary storage. It will be appreciated that the information retained within Fixed Medium 626 may, in appropriate cases, be incorporated in standard fashion as virtual memory in Memory 624. Removable Medium 614 may take the form of any of the computer-readable media described below.

Processor 622 is also coupled to a variety of input/output devices, such as Display 604, Keyboard 610, Mouse 612 and Speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 622 optionally may be coupled to another computer or telecommunications network using Network Interface 640. With such a Network Interface 640, it is contemplated that the Processor 622 might receive information from the network, or might output information to the network in the course of performing the above-described microphone selection methods. Furthermore, method embodiments of the present invention may execute solely upon Processor 622 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 600 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for adaptive microphone selection in a multi-microphone device, the method comprising:

identifying if an echo is present in a first and a second microphone input;

when no echo is present then selecting a default microphone;

when the echo is present then calculating a signal strength measure for the first and the second microphone inputs;

when the signal strength measure for the first and the second microphone inputs are both below a signal strength threshold then selecting the default microphone;

when the signal strength measure for either the first and the second microphone inputs are at or above the signal strength threshold then calculating if the signal strength measure of the first microphone input multiplied by a first multiplier is less than the signal strength measure of the second microphone input, and calculating if the signal strength measure of the second microphone input multiplied by a second multiplier is less than the signal strength measure of the first microphone input;

subtracting from a counter when the signal strength measure of the first microphone input multiplied by the first multiplier is less than the signal strength measure of the second microphone input and adding to the counter when the signal strength measure of the second microphone input multiplied by the second multiplier is less than the signal strength measure of the first microphone input; and selecting the first microphone input when the counter is below a negative threshold, selecting the second microphone input when the counter is above a positive threshold and selecting the default microphone when the counter is at or between the negative and positive thresholds.

2. The method of claim 1, wherein the signal strength measure is a maximum absolute energy, and wherein the maximum absolute energy threshold is approximately 0.05.

3. The method of claim 1, wherein the first multiplier is equal to the second multiplier.

4. The method of claim 3, wherein the first multiplier and the second multiplier are approximately 1.2.

5. The method of claim 1, further comprising analyzing each audio frame for an abnormal condition.

6. The method of claim 5, wherein the abnormal condition includes two conditions being met, wherein the conditions include either the first microphone input or the second microphone input being below a lower energy threshold, and a difference between the first microphone input and the second microphone input is above a difference threshold.

7. The method of claim 6, wherein the lower energy threshold is approximately 77 decibels.

8. The method of claim 6, wherein the difference threshold is approximately 15 decibels.

9. The method of claim 5, wherein if the abnormal condition is detected for a set time interval, then restoring the adaptive microphone selection method to an initial state.

10. The method of claim 9, wherein the set time interval is approximately 500 milliseconds.

11. A computerized system for adaptive microphone selection in a multi-microphone device, the system comprising:

an acoustic echo cancellation module for identifying if an echo is present in a first and a second microphone input;

a processor for selecting a default microphone when no echo is present;

a recorder for calculating a signal strength measure for the first and the second microphone inputs when the echo is present;

the processor further configured to select the default microphone when the signal strength measure for the first and the second microphone inputs are both below a signal strength threshold;

the processor further configured to calculate if the signal strength measure of the first microphone input multiplied by a first multiplier is less than the signal strength measure of the second microphone input, and calculate if the signal strength measure of the second microphone input multiplied by a second multiplier is less than the signal strength measure of the first microphone input when the signal strength measure for either the first and the second microphone inputs are at or above the signal strength threshold;

the processor further configured to subtract from a counter when the signal strength measure of the first microphone input multiplied by the first multiplier is less than the signal strength measure of the second microphone input and add to the counter when the signal strength measure of the second microphone input multiplied by the second multiplier is less than the signal strength measure of the first microphone input; and the processor further configured to select the first microphone input when the counter is below a negative threshold, select the second microphone input when the counter is above a positive threshold and select the default microphone when the counter is at or between the negative and positive thresholds.

12. The system of claim 11, wherein the signal strength measure is a maximum absolute energy, and wherein the maximum absolute energy threshold is approximately 0.05.

13. The system of claim 11, wherein the first multiplier is equal to the second multiplier.

14. The system of claim 13, wherein the first multiplier and the second multiplier are approximately 1.2.

15. The system of claim 11, wherein the processor is further configured to analyze each audio frame for an abnormal condition.

16. The system of claim 15, wherein the abnormal condition includes two conditions being met, wherein the conditions include either the first microphone input or the second microphone input being below a lower energy threshold, and a difference between the first microphone input and the second microphone input is above a difference threshold.

17. The system of claim 16, wherein the lower energy threshold is approximately 77 decibels.

18. The system of claim 16, wherein the difference threshold is approximately 15 decibels.

19. The system of claim 15, wherein if the abnormal condition is detected for a set time interval, then restoring the adaptive microphone selection to an initial state.

20. The system of claim 19, wherein the set time interval is approximately 500 milliseconds.

* * * * *